United States Patent [19]

Knowles

[11] Patent Number: 5,048,367

[45] Date of Patent: Sep. 17, 1991

[54] AUTOMATIC BALANCE APPARATUS

[76] Inventor: Veryl E. Knowles, 7305 S. Yakima Ave., Tacoma, Wash. 98408

[21] Appl. No.: 493,831

[22] Filed: Feb. 26, 1990

[51] Int. Cl.$^5$ ............................................... F16F 15/22
[52] U.S. Cl. .................. 74/573 F; 74/573 R; 301/5 BA
[58] Field of Search ..................... 74/573 R, 573 F; 301/5 B, 5 BA

[56] References Cited

U.S. PATENT DOCUMENTS

| 2,462,198 | 2/1949 | Johnson | 236/93 |
| 2,687,918 | 8/1954 | Bell et al. | 301/5 BA |
| 2,695,047 | 11/1954 | Ruck | 74/573 X |
| 3,346,303 | 10/1967 | Wesley | 74/573 X |
| 3,733,923 | 5/1973 | Goodrich et al. | 74/573 |
| 3,913,980 | 10/1975 | Cobb, Jr. | 74/573 F |
| 3,930,526 | 1/1976 | Edwards | 301/5 BA |
| 4,674,356 | 6/1987 | Kilgore | 74/573 R |
| 4,755,006 | 7/1988 | Clay et al. | 74/573 R |

Primary Examiner—Allan D. Herrmann
Assistant Examiner—Winnie Yip
Attorney, Agent, or Firm—Leon Gilden

[57] ABSTRACT

An apparatus including continuous rigid or semi-rigid annular conduit includes a mercury balance fluid therein contained within the conduit within a predetermined arc. The conduit may include baffle members to maintain orientation of the fluid within the conduit, and optionally includes a ribbed interior surface to enhance securement of the conduit to an interior surface of an associated wheel rim. Further, a modification includes the ribbed surface spaced from an interior annular surface of the conduit by a narrowed central web to permit flexure of the balancer during use to enhance positioning of the balancer when not correctly centered on the associated rim of the wheel.

1 Claim, 5 Drawing Sheets

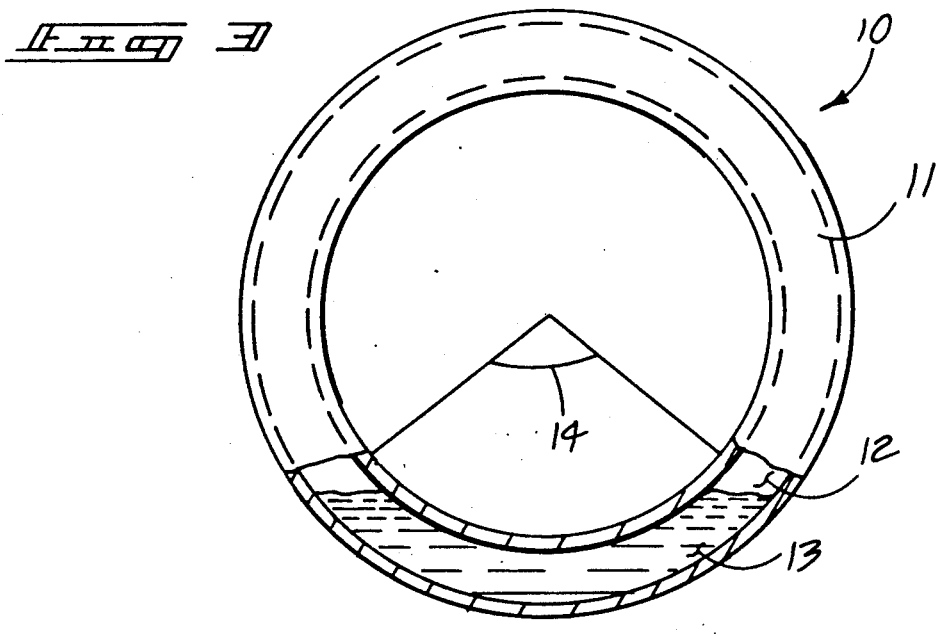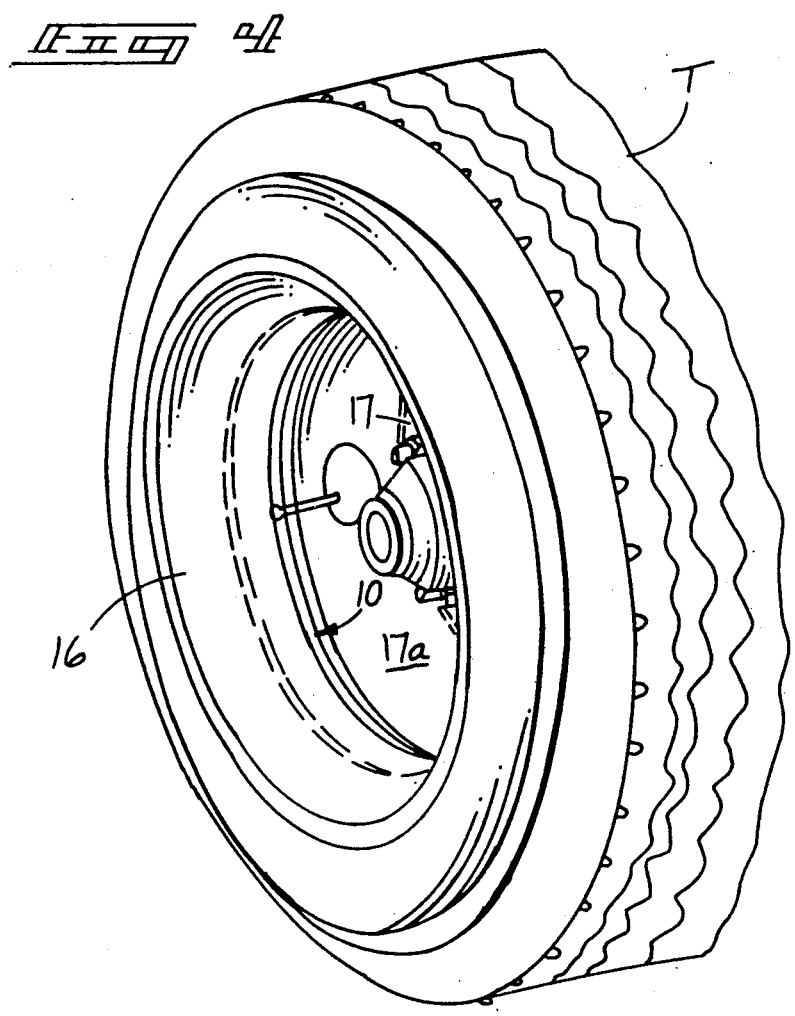

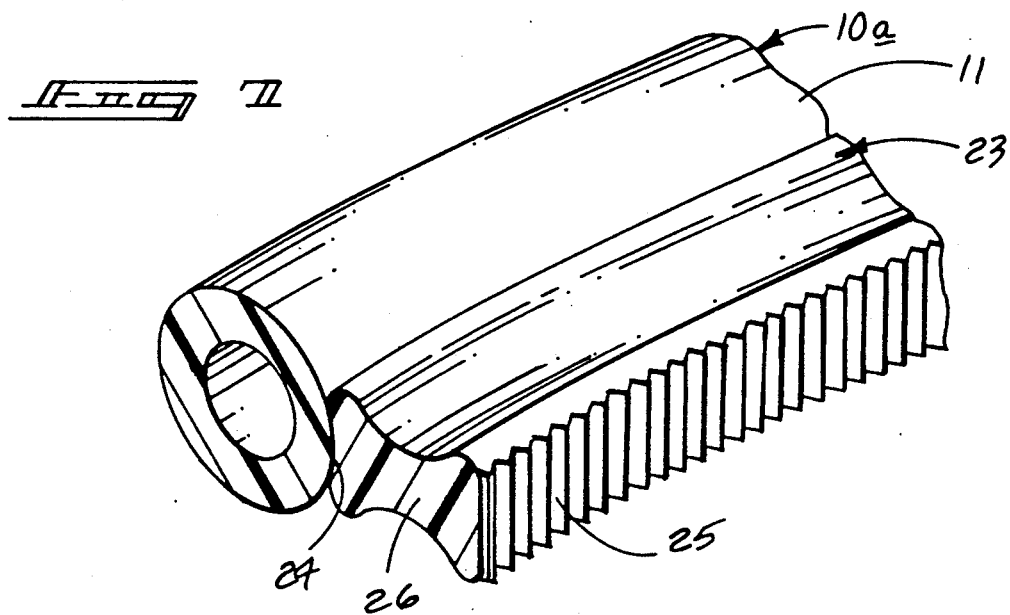
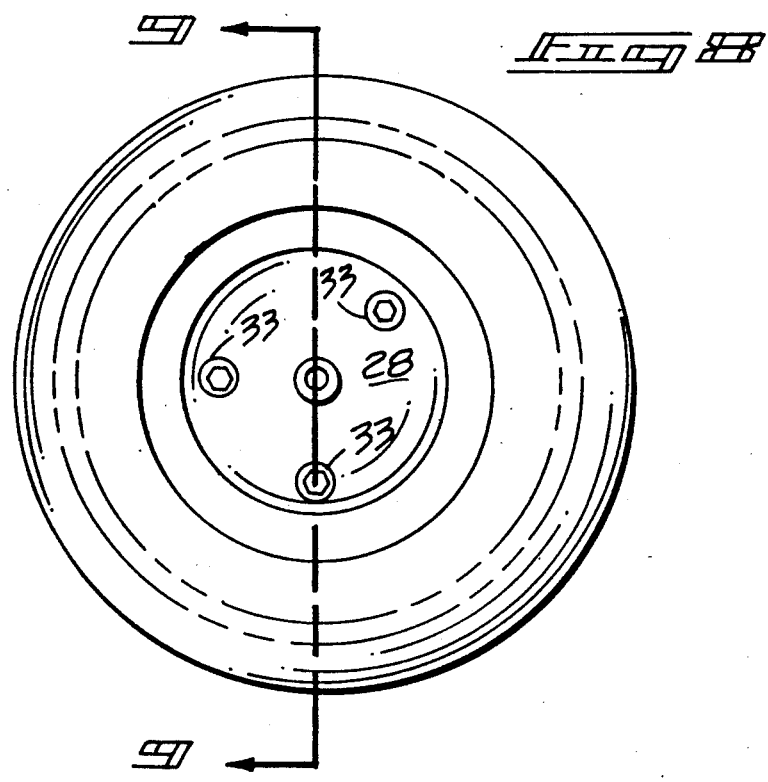

AUTOMATIC BALANCE APPARATUS

BACKGROUND OF THE INVENTION

1. Field of the Invention

The field of invention relates to Automatic balancing apparatus, and more particular pertains to a new and improved Automatic balance apparatus wherein the same is securable to an interior surface of a wheel rim to effect continuous dynamic balancing thereof.

2. Description of the Prior Art

The need for balancing of automotive wheel rims is known in the prior art. Such balancing enhances longevity of an associated wheel, as well as prolonging various automotive components such as wheel bearings, front wheel alignment of the associated automobile, improved steering control of the vehicle and enhanced longevity of associated tires. Prior art apparatus has been utilized to provide dynamic balancing of wheel rims, and such apparatus may found for example in U.S. Pat. No. 4,674,356 to Kilgore wherein a continuous disk includes an annular groove therewithin, wherein the groove sealingly encloses a series of spherical balance weights contained within a lubricating fluid to minimize noise of the weights within the groove.

U.S. Pat. No. 2,687,918 to Bell, et al., provides a continuous conduit integrally formed to an exterior surface of a wheel rim, wherein the conduit includes a mercury fluid therewithin.

U.S. Pat. No. 2,462,198 to Onufer illustrates the use of a balancing fluid contained within a continuous annular tube in a spaced relationship relative to an interior surface of a wheel rim.

U.S. Pat. No. 3,077,914 to Fritts illustrates the use of a wheel rim formed with an included cylindrical channel integrally mounted to the rim, including a balancing fluid contained therewithin.

U.S. Pat. No. 3,733,923 to Goodrich, et al., sets forth a balancer utiliziang a rigid race member including a series of balancing weights rotatably mounted within the balancer contained within a dampening fluid.

As such, it may be appreciated that there continues to be a need for a new and improved Automatic balance apparatus which addresses both the problems of ease of use, as well as effectiveness in construction in providing continuous dynamic balancing of a wheel and to further permit retrofit of such apparatus to existing wheel rims and in this respect, the present invention substantially fulfills this need.

SUMMARY OF THE INVENTION

In view of the foregoing disadvantages inherent in the known types of wheel balance apparatus now present in the prior art, the present invention provides an Automatic balance apparatus wherein the same permits retrofit to existing wheel rims to enable continuous dynamic balancing of an associated wheel and tire arrangement. As such, the general purpose of the present invention, which will be described subsequently in greater detail, is to provide a new and improved Automatic balance apparatus which has all the advantages of the prior art wheel balance apparatus and none of the disadvantages.

To attain this, the present invention provides an apparatus including continuous rigid or semi-rigid annular conduit including a mercury balance fluid therein contained within the conduit within a predetermined arc. The conduit may include baffle members to maintain orientation of the fluid within the conduit, and optionally includes a ribbed interior surface to enhance securement of the conduit to an interior surface of an associated wheel rim. Further, a modification includes the ribbed surface spaced from an interior annular surface of the conduit by a narrowed central web to permit flexure of the balancer during use to enhance positioning of the balancer when not correctly centered on the associated rim of the wheel.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved Automatic balance apparatus which has all the advantages of the prior art wheel balance apparatus and none of the disadvantages.

It is another object of the present invention to provide a new and improved Automatic balance apparatus which may be easily and efficiently manufactured and marketed.

It is a further object of the present invention to provide a new and improved Automatic balance apparatus which is of a durable and reliable construction.

An even further object of the present invention is to provide a new and improved Automatic balance apparatus which is susceptible of a low cost of manufacture with regard to both materials and labor, and which accordingly is then susceptible of low prices of sale to the consuming public, thereby making such vehicular wheel balance apparatus economically available to the buying public.

Still yet another object of the present invention is to provide a new and improved Automatic balance apparatus which provides in the apparatuses and methods of the prior art some of the advantages thereof, while simultaneously overcoming some of the disadvantages normally associated therewith.

Still another object of the present invention is to provide a new and improved Automatic balance apparatus wherein the same is securable to an interior surface of an associated wheel rim to permit continuous dynamic balancing of the wheel and tire combination in use.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an orthographic top plan view of the instant invention.

FIG. 4 is an isometric illustration of the instant invention in association with a wheel and tire arrangement.

FIG. 7 is an isometric sectional view of a modification of the instant invention.

FIG. 8 is an orthographic front view taken in elevation illustrating the use of a clamp member to mount the instant invention to an associated wheel rim.

DESCRIPTION OF THE PREFERRED EMBODIMENT

Figure 1:
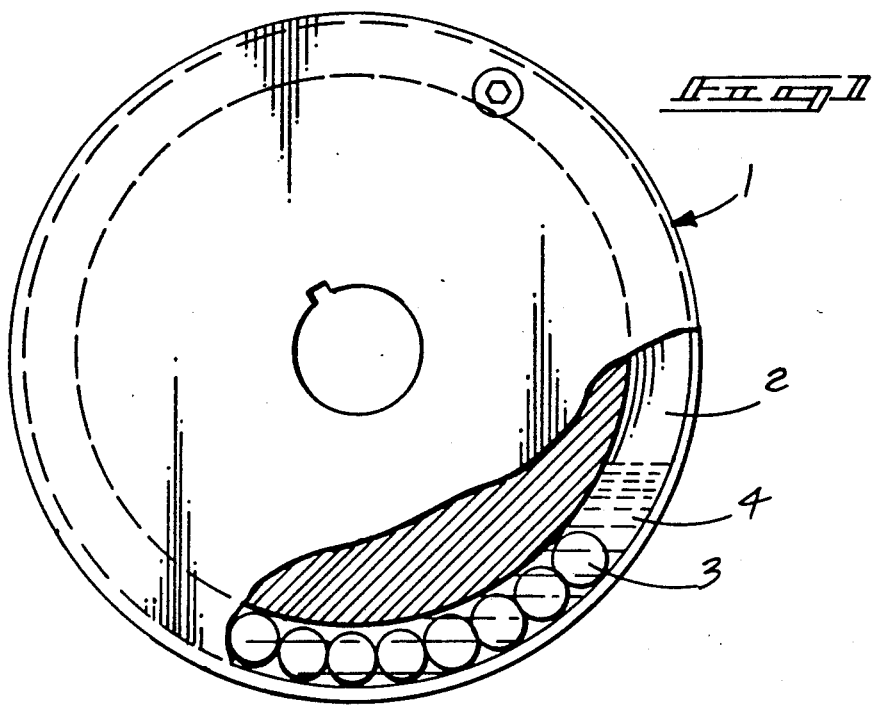
FIG. 1 is an orthographic frontal view, partially in section, of a prior art wheel balance appartus.

With reference now to the drawings, and in particular to FIGS. 1 to 10 thereof, a new and improved Automatic balance apparatus embodying the principles and concepts of the present invention and generally designated by the reference numerals 10 and 10a will be described.

Figure 2:
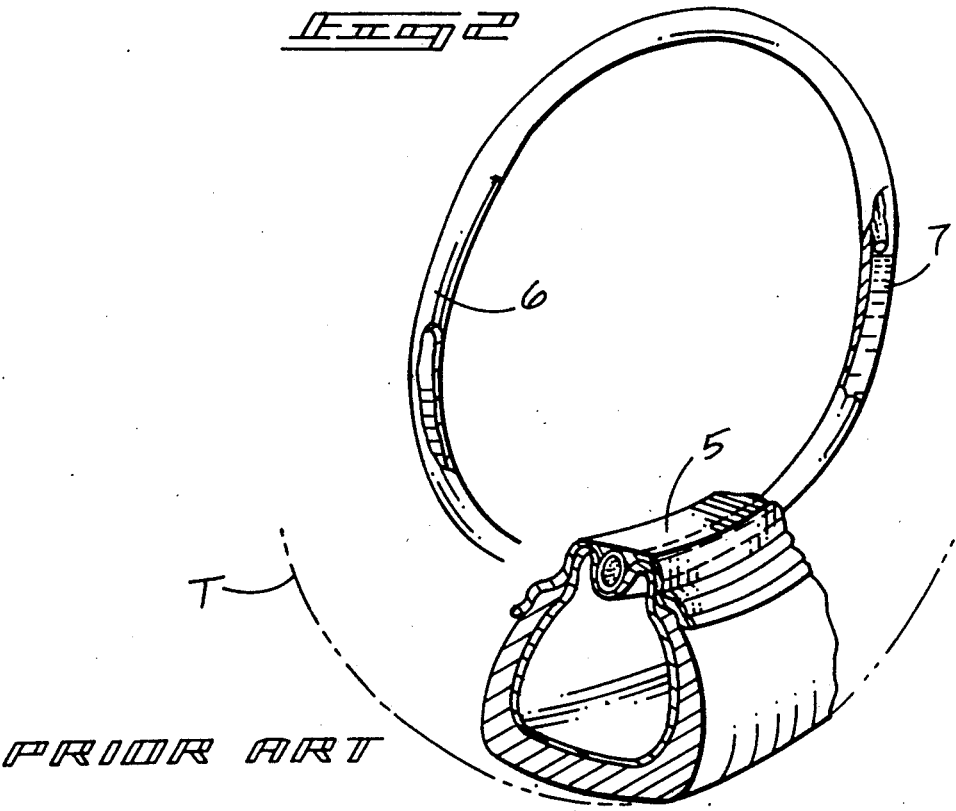
FIG. 2 is an isometric illustration, partially in section, of a further prior art wheel balance apparatus.

FIG. 1 illustratesa a prior art wheel balancing apparatus 1 comprising an annular disk including a channel 2 directed through a peripheral annular edge of the disk, including a series of spherical balance balls 3 rotatably mounted within the groove, with a lubricating fluid enclosing the balls to minimize noise developing from the balls rotatably repositioning themselves within the groove. FIG. 2 illustrates a further prior art organization including an annular enclosed tube 6 including a mercury fluid 7 to effect balancing of the tube, wherein the tube is integrally formed to an interior surface of a wheel rim 5 mounting a tire "T" thereon.

The vehicular wheel apparatus 10 of the instant invention essentially comprises a semi-rigid deformable annular tube 11 defining a continuous conduit 12 therewithin. A mercury balance fluid 13 is contained within the conduit 12 and is of a quantity to define an angle of arc 14 within the conduit between twenty and one hundred ten degrees, as illustrated in FIG. 3 for example. The apparatus 10 is accordingly positionable within a tire support wheel 16 positioned adjacent the wheel central web 17 about the wheel annular 17a, as illustrated in FIG. 4.

Figure 5:
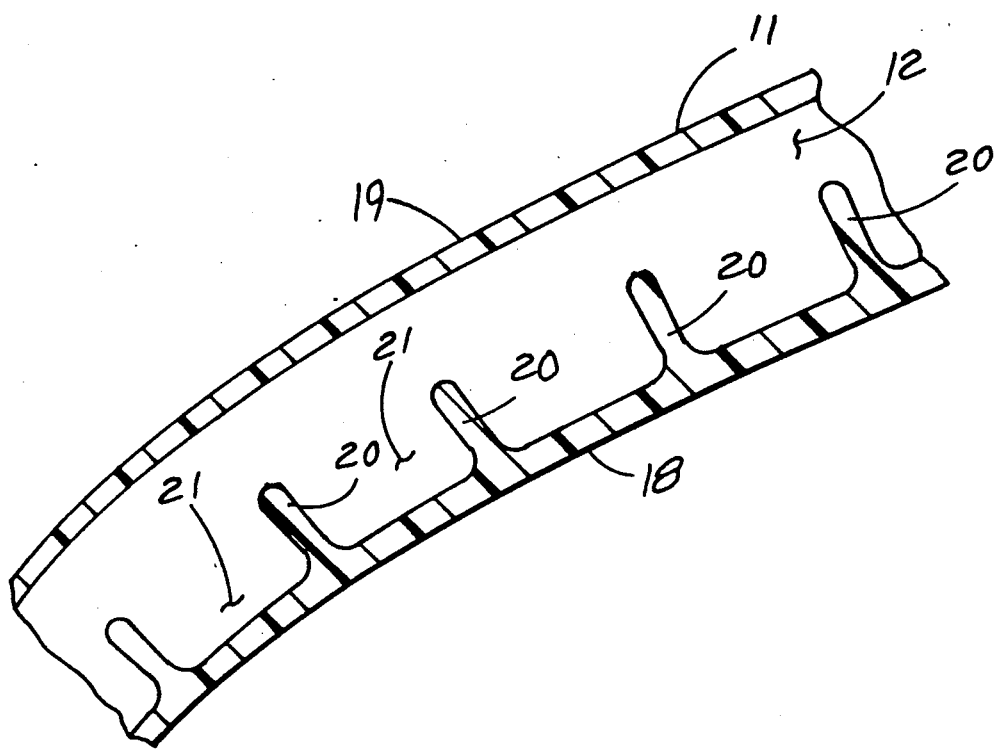
FIG. 5 is a partial cross-sectional view of the annular tube of the instant invention.

Reference to FIG. 5 illustrates the conduit 12 defined by a diametrically aligned outer wall surface 19 spaced from an opposed diametrically aligned inner wall surface 18. A series of ribs 20 are fixedly and orthogonally mounted projecting interiorly of the conduit 12 from an interior surface of the inner wall surface 18, as illustrated in FIG. 5. The positioning of the ribs 20 accordingly effect dampening of the motion of the balancing mercury fluid 13 within the conduit 12 to assist in maintaining dampening of the associated tire and wheel apparatus as a wheel changes velocity due to abrupt acceleration from high to low speeds for example, as the mercury balancing fluid is momentarily maintained within the holding troughs 21 formed between the aligned ribs 20.

Figure 6:
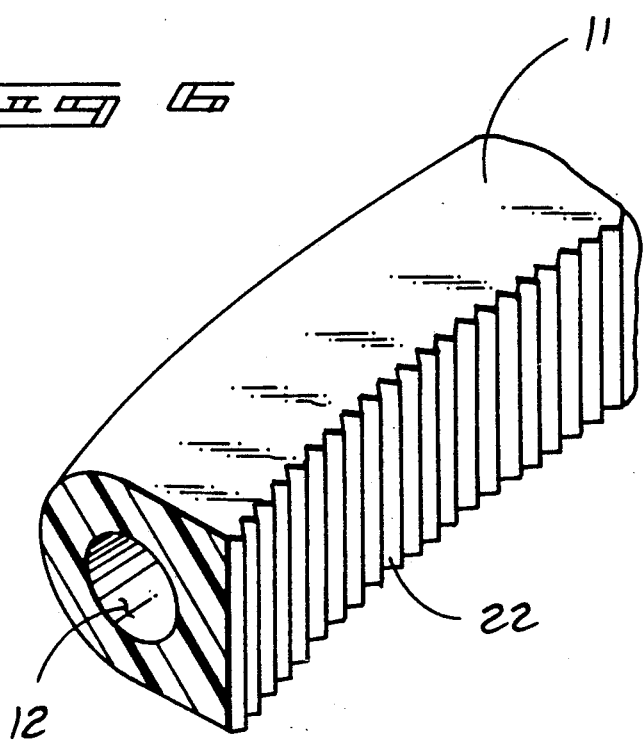
FIG. 6 is an isometric illustration, partially in section, of a modification of the tube of the instant invention.
Figure 9:
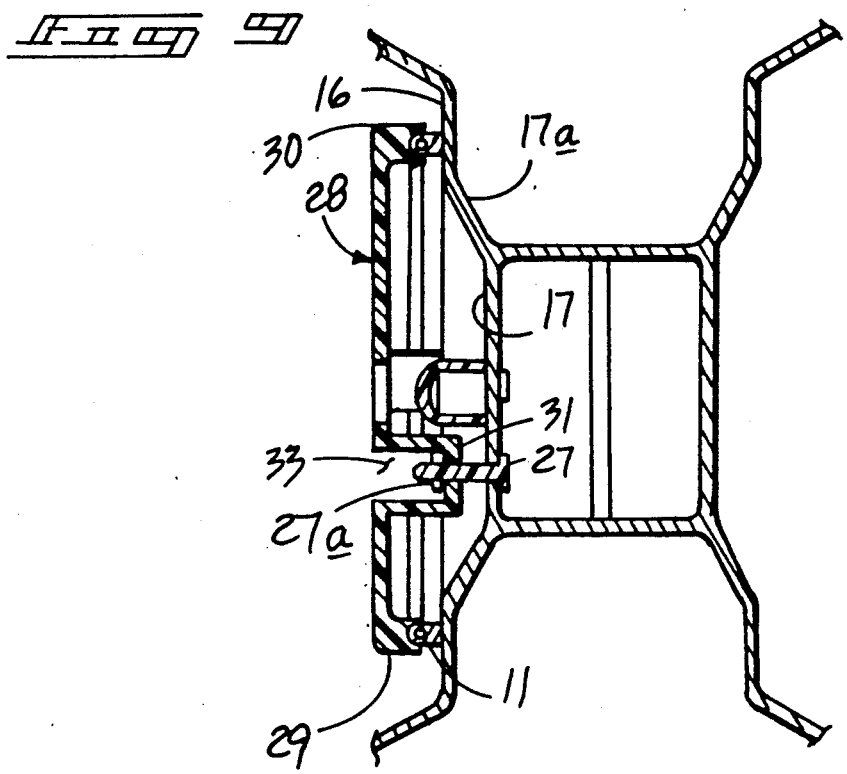
FIG. 9 is an orthographic view taken along the lines 9—9 of FIG. 8 in the direction indicated by the arrows.

FIG. 6 illustrates the annular tube 11 formed with a generally planar inner wall surface 22 that includes a series of ribs that are disposed parallel to the axis of the tube 11. This ribbed flat surface permits the balancer to maintain positioning relative to an interior surface of the annular rim 17a of the wheel or against the tire support web 16 by utilizing an adhesive of a various type to permit gluing of the tube in position, as illustrated in FIG. 9 for example.

FIG. 7 illustrates a further modified wheel balance apparatus 10a, wherein the tube 11 is adhesively mounted to an arcuate exterior face 24 of an inner annular securement web parallel to and spaced from an outer annular securement web 25 that includes a ribbed planar lower face, including spaced parallel ribs also aligned parallel to the axis of the tube 11. A flexible narrowed central web 26 mounts the inner and outer webs together and permits flexure between the inner and outer webs to accommodate balancing by the tube when the balancer is not completely centered within the rim and accommodate deviation of such offset securement of the tube.

Figure 10:
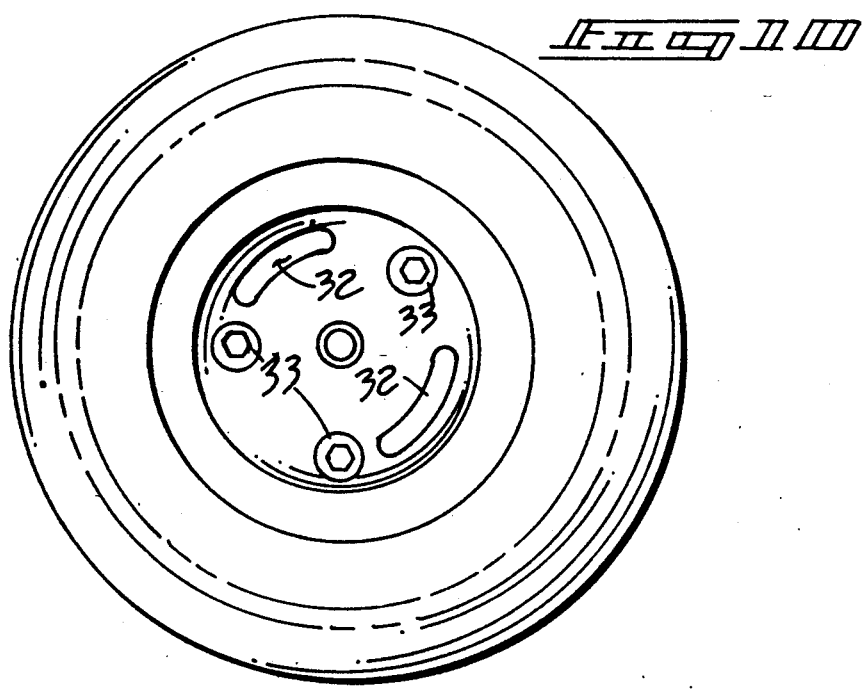
FIG. 10 is an orthographic front view taken in elevation of a modification of the clamp member utilized by the instant invention.

FIG. 8 illustrates a clamp disk 28 mounted to the tire wheel support web 16 to enhance securement and alignment of the organizaiton 10a and provide centered mounting of the ribbed planar lower face 25 onto the web 16, wherein the clamp disk 28 includes a series of openings 31 in an annular array to receive a wheel bolt 27 within a respective cylindrical recess 33 arranged around each opening 31. The disk 28 includes an annular skirt 29 orthogonally oriented relative to the disk 28 that includes an encircling groove 30 defined by a semicircular cross-sectional configuration to receive the tube 11 therewithin, wherein the disk 28 includes a plurality of spaced handle slots 32, as illustrated in FIG. 10, that may be included within the disk to permit manual positioning and securement of the disk when mounting upon the web support 16 of the wheel. Upon an adhesive curing, the disk 28 may be removed with the organization 10 in permanent securement relative to the wheel web 16.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A vehicular wheel balance apparatus for securement to an annular wheel to provide dynamic balancing of the wheel, wherein the wheel includes a planar web mounting the wheel balance apparatus thereon, wherein the apparatus comprises, an annular tube of semi-rigid deformable material, the tube including a continuous conduit therewithin, and a mercury balancing fluid contained within the conduit for effecting dynamic balancing of the wheel during rotation of the wheel, and the mercury balance contained within the conduit with the balance fluid contained within a predetermined angle of arc within the conduit, and wherein the predetermined angle of arc is within a range of 20 to 110 degrees, and wherein the annular tube includes an outer surface diametrically aligned with an inner surface, and an inner web member includes an inner securement means for securement of an inner surface of the planar web, and wherein the securement means includes an inner securement web and an outer securement web, the inner securement web including an arcuate exterior face adhesively securing the inner surface of the annular tube therewithin, the outer securement web including a series of equally spaced ribs formed thereon, and the annular tube formed about a predetermined axis, and the ribs arranged parallel to and spaced from the axis, and wherein the outer securement web and the inner securement web are arranged spaced relative to one another, and further including a narrowed central web defined by a width less than that of the outer securement web inner securement web, and wherein the central web is flexible to flexibly secure the outer securement web relative to the inner securement web.

* * * * *